United States Patent
Gonzalez et al.

(10) Patent No.: US 8,130,391 B2
(45) Date of Patent: Mar. 6, 2012

(54) PRINTING OF DOCUMENTS WITH POSITION IDENTIFICATION PATTERN

(75) Inventors: Manuel Gonzalez, Barcelona (ES); Jean-Michel Combe, Domène (FR)

(73) Assignee: Hewlett-Packard Development Company L.P., Houston, TX (US)

( * ) Notice: Subject to any disclaimer, the term of this patent is extended or adjusted under 35 U.S.C. 154(b) by 1095 days.

(21) Appl. No.: 10/571,002

(22) PCT Filed: Aug. 27, 2004

(86) PCT No.: PCT/EP2004/051933
§ 371 (c)(1), (2), (4) Date: Dec. 19, 2006

(87) PCT Pub. No.: WO2005/024700
PCT Pub. Date: Mar. 17, 2005

(65) Prior Publication Data
US 2007/0086032 A1    Apr. 19, 2007

(30) Foreign Application Priority Data
Sep. 10, 2003 (GB) .................................. 0321168.7

(51) Int. Cl.
*G06F 3/12* (2006.01)
(52) U.S. Cl. ................ 358/1.15; 358/1.18; 178/18.01
(58) Field of Classification Search .................. 345/173, 345/421, 162; 358/1.15; 235/494; 707/1; 341/89; 382/224, 274; 726/34
See application file for complete search history.

(56) References Cited

U.S. PATENT DOCUMENTS

| | | | |
|---|---|---|---|
| 5,696,365 A | 12/1997 | Ukai et al. | |
| 6,068,188 A | 5/2000 | Knowles et al. | |
| 6,076,734 A | 6/2000 | Dougherty et al. | |
| 6,502,756 B1 * | 1/2003 | Fåhraeus | 235/494 |
| 6,674,427 B1 * | 1/2004 | Pettersson et al. | 235/494 |
| 6,689,966 B2 * | 2/2004 | Wiebe | 235/494 |
| 6,864,880 B2 * | 3/2005 | Hugosson et al. | 345/162 |
| 6,958,747 B2 * | 10/2005 | Sahlberg et al. | 345/173 |
| 6,962,450 B2 * | 11/2005 | Brouhon et al. | 400/76 |
| 7,110,604 B2 * | 9/2006 | Olsson | 382/224 |
| 7,134,606 B2 * | 11/2006 | Chou | 235/494 |
| 7,143,952 B2 * | 12/2006 | Ericson | 235/494 |
| 7,249,716 B2 * | 7/2007 | Bryborn | 235/494 |
| 7,254,839 B2 * | 8/2007 | Fahraeus et al. | 726/34 |
| 7,417,773 B2 * | 8/2008 | Braun et al. | 358/1.15 |
| 7,457,476 B2 * | 11/2008 | Olsson | 382/274 |
| 7,751,089 B2 * | 7/2010 | Fahraeus et al. | 358/1.15 |
| 7,753,283 B2 * | 7/2010 | Lynggaard | 235/494 |
| 2002/0033820 A1 * | 3/2002 | Wiebe | 345/421 |

(Continued)

FOREIGN PATENT DOCUMENTS
EP    0 867 825    9/1998
(Continued)

*Primary Examiner* — Twyler Haskins
*Assistant Examiner* — Nicholas Pachol (57) ABSTRACT

A system for printing documents 100 having a position identifying pattern 108 on them comprises a memory 403 arranged to have a document definition 410 stored therein which defines a document having at least one pattern area 107 and a printing control system 400, 408, 306, 307, 309 arranged to print a document instance from the definition by allocating an identity to the document instance, associating an area 700, 718, 720, 721, 722 of pattern space with the document instance, and printing the document instance, wherein the printing control system is arranged to move the boundaries of the defined pattern area before printing the document instance.

20 Claims, 10 Drawing Sheets

U.S. PATENT DOCUMENTS

| | | | |
|---|---|---|---|
| 2002/0054778 A1 | 5/2002 | Ericson et al. | |
| 2002/0159089 A1* | 10/2002 | Wiebe et al. | 358/1.15 |
| 2003/0004989 A1 | 1/2003 | Tomasi | |
| 2003/0061188 A1* | 3/2003 | Wiebe et al. | 707/1 |
| 2003/0066896 A1* | 4/2003 | Pettersson et al. | 235/494 |
| 2004/0061888 A1* | 4/2004 | Braun et al. | 358/1.15 |
| 2005/0052700 A1* | 3/2005 | Mackenzie et al. | 358/1.18 |
| 2005/0053405 A1* | 3/2005 | Brouhon et al. | 400/76 |
| 2005/0134563 A1* | 6/2005 | Hugosson et al. | 345/162 |
| 2005/0145703 A1* | 7/2005 | Bryborn | 235/494 |
| 2005/0253743 A1* | 11/2005 | Sahlberg et al. | 341/89 |
| 2007/0273918 A1* | 11/2007 | Gonzalez | 358/1.15 |
| 2008/0049258 A1* | 2/2008 | Moyo et al. | 358/3.28 |

FOREIGN PATENT DOCUMENTS

| | | |
|---|---|---|
| EP | 0 743 614 | 1/2002 |
| WO | 00/73981 | 12/2000 |
| WO | 01/02939 | 1/2001 |
| WO | 01/75723 | 10/2001 |
| WO | 02/19260 | 3/2002 |
| WO | 02/082366 | 10/2002 |

* cited by examiner

PRINTING OF DOCUMENTS WITH POSITION IDENTIFICATION PATTERN

FIELD OF THE INVENTION

The present invention relates to the printing of documents which have a position identification pattern, made up of markings on the document, which can be detected by a suitable detection system and used to distinguish different positions on the document. The printed document may be a form or other printable document such as a label or note pad.

BACKGROUND TO THE INVENTION

It is known to use documents having such position identification markings in combination with a pen having an imaging system, such as an infra red camera, within it, which is arranged to image a small area of the page close to the pen nib. The pen includes a processor having image processing capabilities and a memory and is triggered by a force sensor in the nib to record images from the camera as the pen is moved across the document. From these images the pen can determine the position of any marks made on the document by the pen. The pen markings can be stored directly as graphic images, which can then be stored and displayed in combination with other markings on the document. In some applications the simple recognition that a mark has been made by the pen on a predefined area of the document can be recorded, and this information used in any suitable way. This allows, for example, forms with check boxes on to be provided and the marking of the check boxes with the pen detected. In further applications the pen markings are analysed using character recognition tools and stored digitally as text. Systems using this technology are available from Anoto AB and described on their website www.Anoto.com.

For such a system to be able to handle a large number of documents it is desirable for the system to be able to define a large area of pattern space, any part of which can be identified by the markings on it, and to be able to allocate parts of that pattern space to respective documents in such a way that the allocation can be recorded and referred to when the document is used. In known systems this is typically achieved by defining a number of pages within the pattern space, allocating a group of pages to a particular application, such as a particular type of form, and printing a group of documents each one having the pattern from one or more pages of the pattern space on it. The documents are then stored or distributed as hard copy for later use.

It is known from WO 01/75723 to provide a system for producing valuable documents such as gift vouchers. In this system a central server has defined in it a number of coordinate areas, i.e. predefined areas of pattern space, together with an ordering system for a valuable document having a predefined format. A user who wants to order a gift voucher connects his computer to the server and inputs information specific to his request such as the name and address of the intended recipient of the document. The server then allocates an area of pattern space to the document before forwarding the document to the recipient, who prints it out for use. Alternatively the document can be printed out by the server and sent to the recipient by post. This system is therefore designed to allow a user to print documents with position identification coding remotely, and provides the ability to have pre-designed valuable documents printed individually in response to a specific order for such a document.

WO 02/19260 describes a development system for a printed product having position identification pattern on it. The system allows a document, such as a form, to be designed electronically and to have position identification pattern included in a digital representation of the document. The form is tested using the digital representation and a mouse, which emulates the digital pen that would be used on a hard copy of the document. After the form has been designed and tested it can be printed for further testing. Provided the tests are satisfactory the document is sent to a printing press where a large batch of the documents are pre-printed for distribution and use.

SUMMARY OF THE INVENTION

The present invention provides a system for printing documents having a position identifying pattern on them, the system comprising a memory arranged to have a document definition stored therein which defines a document having at least one pattern area to which position identifying pattern is to be allocated, and printing control means arranged to:
a) move the boundaries of the defined pattern area to produce a modified document definition,
b) allocate an area of pattern space to the pattern area, and
c) cause printing of the document instance.

The steps a), b) and c) can each be performed for each of a number of document instances all of which are printed from the original document definition. Alternatively step a) may only be performed once for a group of document instances each of which is to be printed to a single modified design from the original document definition.

The present invention can therefore provide a flexible system which allows a user to modify and print, on demand, individual documents or groups of documents which have position identifying pattern on them and which are therefore fully functional as part of a digital pen and paper system.

The printing control means may either allocate an area of pattern space to the document instance in order to print it, or it may contact a pattern space allocation system which responds by allocating an area of pattern space and communicating the allocated space back to the printing control means.

Preferably the system further comprising a user interface arranged to enable a user to control the printing control means to move the boundaries of the defined pattern area for the document instance before causing printing of the document instance from the design definition. Typically the user interface will include a display screen which allows the user to view the document as he is amending it.

The printing control means may be arranged to move the boundaries of the pattern space by moving the pattern space, increasing or decreasing its size, merging it with another, or splitting it into two or more separate pattern areas. The printing control means may also be arranged to modify a function associated with the pattern area before causing printing of the document instance. This flexibility allows the user to substantially re-design the document each time it is printed.

The printing control means may be arranged to allocate separate areas of pattern space to respective pattern areas in one document instance. This helps to increase the flexibility of the system, because each pattern area can more easily be moved or modified independently of the others.

The system may include a pattern space allocation means arranged to allocate an area of pattern space to be associated with the document instance, and to record which area of pattern space has been so allocated thereby to enable the association of pen stroke data, derived from pen strokes on the printed document instance, to the document instance. As indicated above, the pattern space allocation means may form part of the printing control means. However, it may comprise a separate system.

The present invention also provides corresponding methods of producing documents, and a data carrier carrying data arranged to cause a computer system to carry out the method of the invention or to operate as a system according to the invention. The data carrier can comprise a floppy disk, a CDROM, a DVD ROM/RAM (including +RW, -RW), a hard drive, a non-volatile memory, any form of magneto optical disk, a wire, a transmitted signal (which may comprise an internet download, an ftp transfer, or the like), or any other form of computer readable medium.

Preferred embodiments of the present invention will now be described by way of example only with reference to the accompanying drawings.

Figures 1, 2:
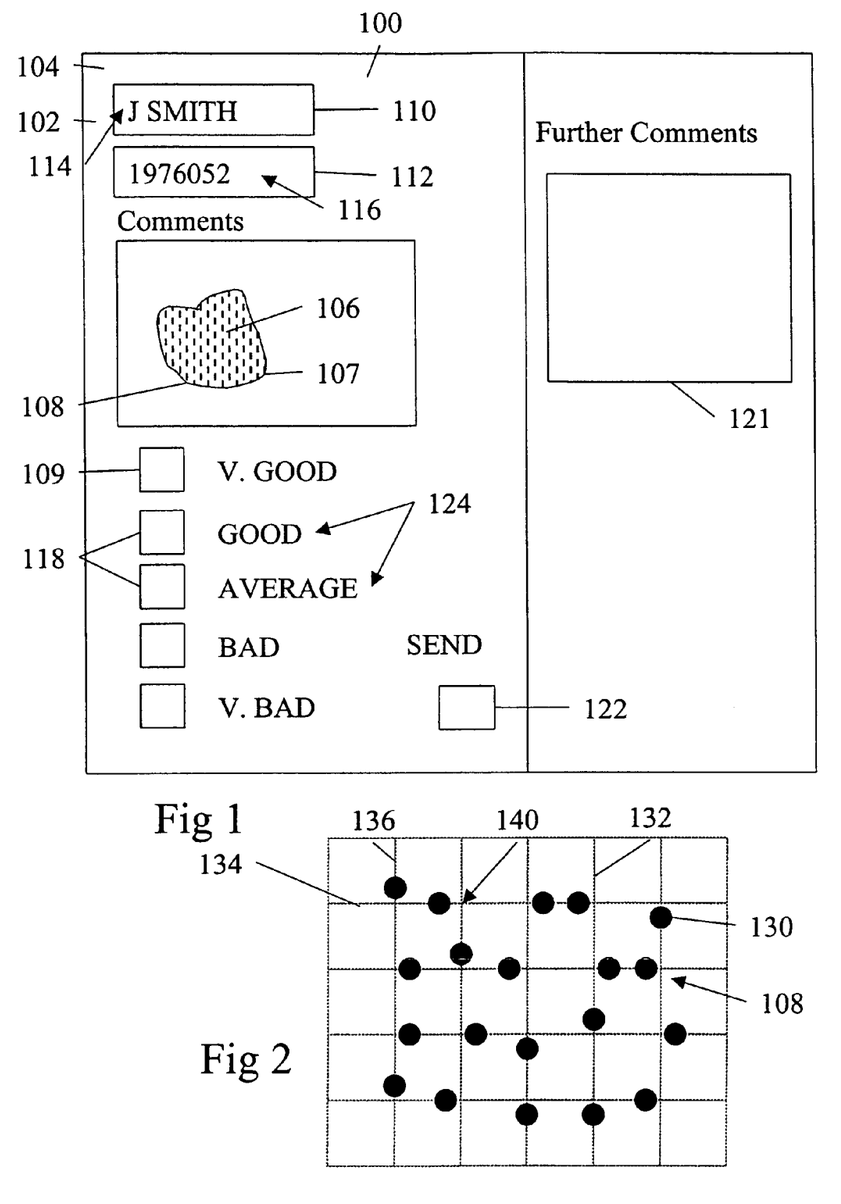
FIG. 1 shows a document printed according to a method of an embodiment of the invention.
FIG. 2 shows in detail part of the document of FIG. 1.

Referring to FIG. 1 a document 100 for use in a digital pen and paper system comprises a carrier 102 in the form of a single sheet of paper 104 with position identifying markings 106 printed on some parts of it to form areas 107 of a position identifying pattern 108. Also printed on the paper 104 are further markings 109 which are clearly visible to a human user of the form, and which make up the content of the document 100. The content 109 will obviously depend entirely on the intended use of the document. In this case an example of a very simple two page questionnaire is shown, and the content includes a number of boxes 110, 112 which can be pre-printed with user specific information such as the user's name 114 and a document identification number 116. The content further comprises a number of check boxes 118 any one of which is to be marked by the user, and two larger boxes 120, 121 in which the user can write comments. The form content also includes a send box 122 to be checked by the user when he has completed the questionnaire to initiate a document completion process by which pen stroke data is forwarded for processing, and typographical information on the form such as the headings or labels 124 for the various boxes 110, 112, 118, 120. The position identifying pattern 108 is only printed onto the parts of the form which the user is expected to write on or mark, that is within the check boxes 118, the comments boxes 120, 121 and the send box 122.

Referring to FIG. 2, the position identifying pattern 108 is made up of a number of dots 130 arranged on an imaginary grid 132. The grid 132 can be considered as being made up of horizontal and vertical lines 134, 136 defining a number of intersections 140 where they cross. The intersections 140 are of the order of 0.3 mm apart, and the dots are of the order of 100 µm across. One dot 130 is provided at each intersection 140, but offset slightly in one of four possible directions up, down, left or right, from the actual intersection 140. The dot offsets are arranged to vary in a systematic way so that any group of sufficient number of dots 130, for example any group of 36 dots arranged in a six by six square, will be unique within a very large area of the pattern. This large area is defined as a total imaginary pattern space, and only a small part of the pattern space is taken up by the pattern on the document 100. By allocating a known area of the pattern space to the document 100, for example by means of a co-ordinate reference, the document and any position on the patterned parts of it can be identified from the pattern printed on it. An example of this type of pattern is described in WO 01/26033. It will be appreciated that other position identifying patterns can equally be used. Some examples of other suitable patterns are described in WO 00/73983 and WO 01/71643.

Figure 3:
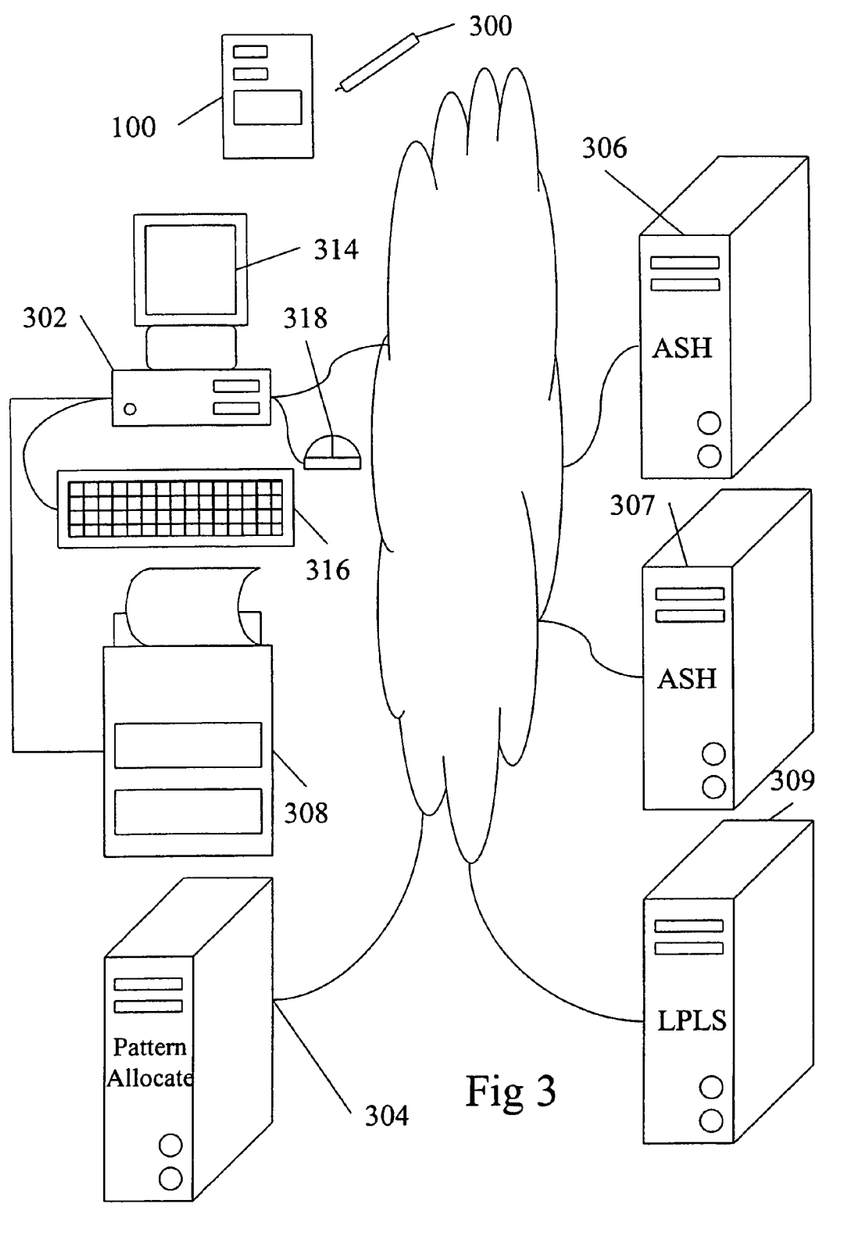
FIG. 3 shows a computer system arranged to process information from the form of FIG. 1.

Referring to FIG. 3 an internet based system for using the document 100 comprises a pen 300 arranged to write on the document 100 and to detect its position on the document from the pattern 108, and an internet connected personal computer (PC) 302 arranged to run an application for processing data from the pen 300, for example by modifying a file in which the document 100 is stored electronically in response to pen strokes made on the document 100 with the pen 300. The PC 302 includes a user interface including a screen 314, a keyboard 316 and a mouse 318, as well as a processor, a memory, and I/O software devices by means of which the processor communicates with the screen 314, the keyboard 316, the mouse 318 and a communications port by means of which it communicates with the internet. The system also includes an internet connected server 304 which has stored on it a record of which areas of the pattern space are allocated to which documents, and which is also able to allocate unused areas of the pattern space to documents on request. An application service handler (ASH) 306, which is a program run, in this case, on a separate server having its own memory, processor I/O devices and communications port, is also provided with internet connection. The ASH 306 is arranged to interpret the pen strokes recorded by the pen 300, as described below, converting them to an input suitable for the application on the PC 302. The ASH includes an image character recognition (ICR) program so that it can interpret handwritten input on the document 100 and convert it to digital text. A further ASH 307 is also provided, and is associated with a different application and arranged to interpret pen strokes for that application. Essentially there is one ASH for each application that makes use of the digital pen and paper system. Each ASH 306, 307 needs to have a record of the layout of any particular document 100 including the positions, dimensions and functions of each of the patterned areas so that it can process any pen strokes made on the document 100. A printer 308 is also provided, which in this case is on a local network 310 with the PC. The printer 308 in this case is a laser printer with 1200 dpi resolution. Other printers having sufficient resolution to print the position identifying pattern could also be used. A local paper lookup service (LPLS) 309 is also provided on a separate server with internet connection. This includes a program arranged to receive data from the pen when the pen has been used on the document 100, the data identifying which areas of pattern space have been written on. Typically the pattern space that is associated with the send box 122, and which the pen 300 has recognized as a prompt to contact the LPLS, is identified to the LPLS 309. The LPLS 309 is then arranged to interrogate the pattern allocation server 304 to determine the unique identity of the document 100, and which application the document is associated with, and therefore which of the ASHs 306, 307 should be used for that application. The LPLS then identifies the appropriate ASH 306 and the document identity to the pen. The pen can then send the pen stroke data and the document identity to the correct ASH 306, 307.

It will be understood that the various components of the system can all be located at separate locations, communicating via the internet as described. Alternatively some or all of them could be provided together on a single server, or grouped on a local network. This might be appropriate where a self-contained system for a limited number of applications is required.

Figure 4:
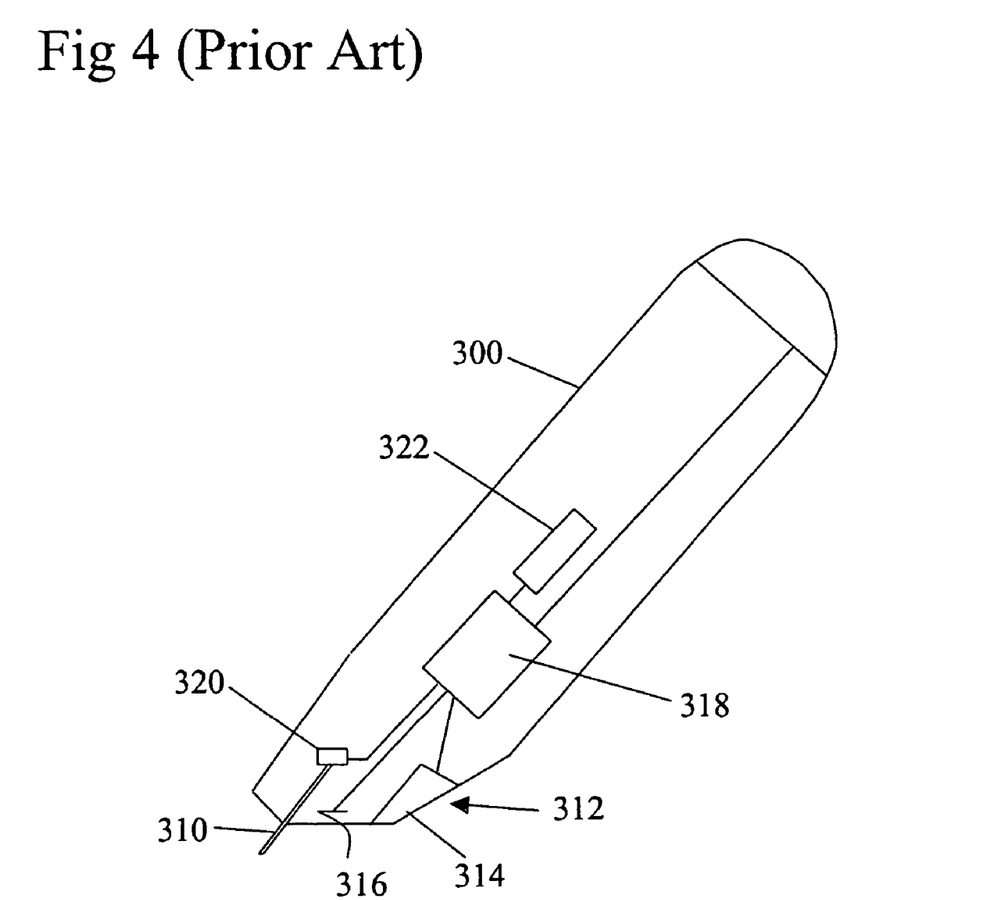
FIG. 4 shows a pen for use with the document of FIG. 1.

Referring to FIG. 4, the pen 300 comprises a writing nib 310, and a camera 312 made up of an infra red (IR) LED 314 and an IR sensor 316. The camera 312 is arranged to image a circular area adjacent to the tip 311 of the pen nib 310. A processor 318 processes images from the camera 312 taken at a predetermined rapid sample rate. A pressure sensor 320 detects when the nib 310 is in contact with the document 100 and triggers operation of the camera 312. Whenever the pen is being used on a patterned area of the document 100, the processor 318 can therefore determine from the pattern 108 the position of the nib of the pen whenever it is in contact with the document 100. From this it can determine the position and shape of any marks made on the patterned areas of the document 100. This information is stored in a memory 322 in the pen as it is being used. When the user has finished marking the document, in this case when the questionnaire is completed, this is recorded in a document completion process, for example by making a mark with the pen in the send box 122. The pen is arranged to recognise the pattern in the send box 122 and determine from that pattern the identity of the document 100. It then sends this document identification information to the LPLS 309, which identifies the relevant ASH 306 to the pen 300, by sending the URL of the ASH 306 to the pen 300. The pen stroke data is then sent by the pen 300 to the ASH 306 which converts it to a suitable format for input to the application 402. The pen 300 can be connected to the network in any suitable manner, but in this case it is via a Bluetooth radio link with the PC 302. Suitable pens are available from Logitech under the trade mark Logitech Io.

Figure 5:
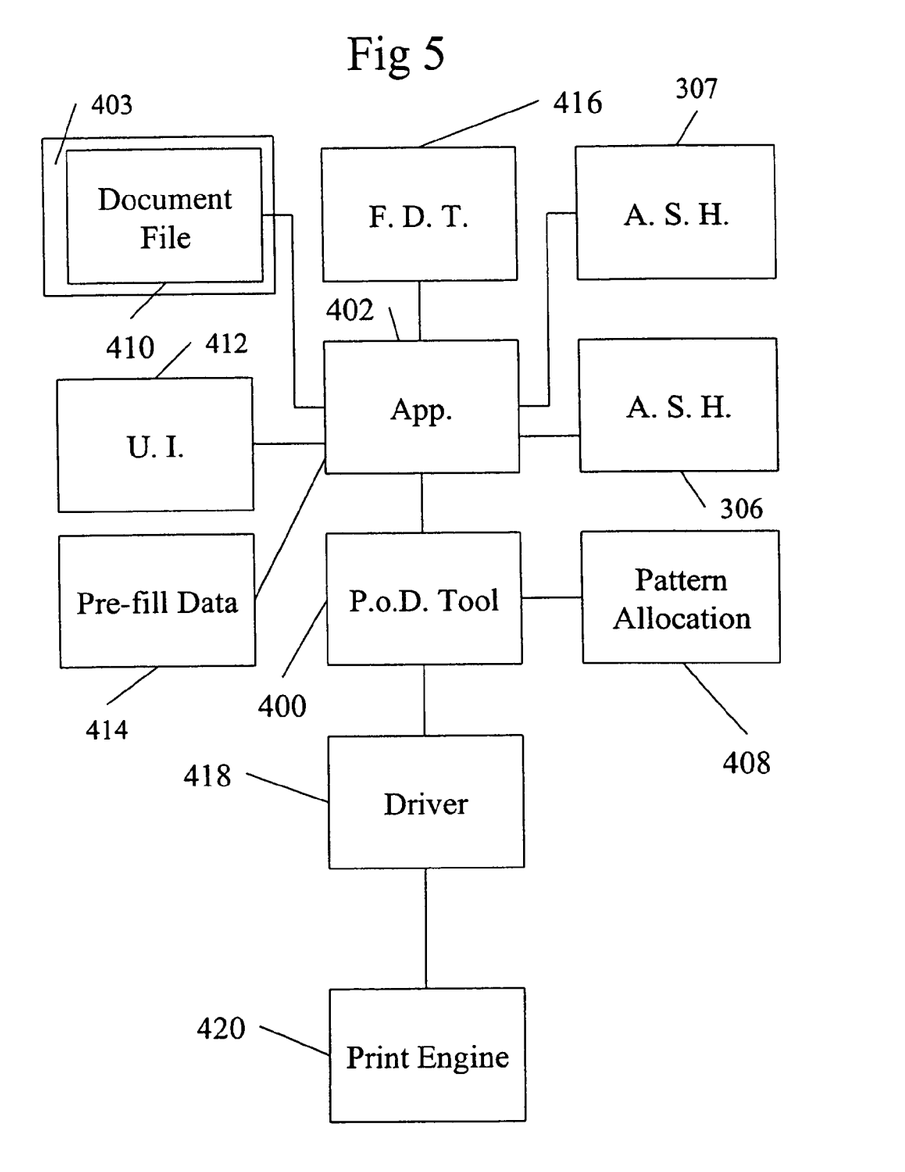
FIG. 5 shows a system according to an embodiment of the invention for creating and printing the document of FIG. 1.

In order to provide flexibility the system also needs to be set up so that the user can generate whatever number of documents 100 he needs for a particular application. Referring to FIG. 5, which shows the functional units of the system, printing of documents 100 is controlled by a print on demand (PoD) tool 400, which is arranged to receive print demands from the application 402, and to send print instructions to a print engine 404 in the printer 308 via a printer driver 406 on the PC 302. The PoD tool 400 is also arranged to communicate with the a pattern allocation module 408 in the pattern allocation server 304 to send a request for allocation of a required area of pattern space, and receive back an indication of the allocated space. In this case the PoD tool 400 takes the form of software in a printer filter driver within the PC 302. However, it could incorporated in firmware in the printer 308.

The application 402 is arranged to create, design, modify, and process documents such as the questionnaire document 100 shown in FIG. 1. It therefore has access to a number of document definition files and templates, which are stored as PDF (Portable Document Format as defined by Adobe) files in the memory 403 of the PC 302. One of the templates 410 forms the basis for the document 100. The templates each correspond to a separate document name and include information relating to a respective type of document. This includes the number of separate pattern areas required from the pattern allocation server 304 for the document type, and the dimensions of those areas. It should be noted that these areas as defined by the pattern allocation server 304 do not necessarily correspond to the areas on the document 100. This is because the system can take any pattern area allocated by the server 304, and split it up and move parts of it around on the document 100 as will be described in more detail below. However this information needs to be sufficient to get a large enough total pattern area from the server 304, and provide a sufficient indication as to its use for the server 304 to be able to allocate it. In this case the server 304 allocates the pattern areas in pages, and for the form 100 only one page of pattern is required. Therefore the document template simply specifies the need for one page of pattern space and indicates the use only in general terms by means of the document ID. The saved document files generally include the information from one of the templates and further information designed into the specific document. The full makeup of the document definition files is described in more detail below.

The PC's user interface 412 allows a user to view documents using the application 402 on the screen 314 of the PC 302, and make modifications to them. The user interface 412 includes the keyboard 316 and mouse 318 and software for processing inputs from them, as well as the screen 314 and software for producing the images on it. The application 402 has access to a database 414 of data, such as user names 114 and identification numbers 116, which will need to be associated with each particular document 100 and printed out with the document 100 as pre-filled data. This database 414 may be on the PC or elsewhere on the network.

Figure 6:
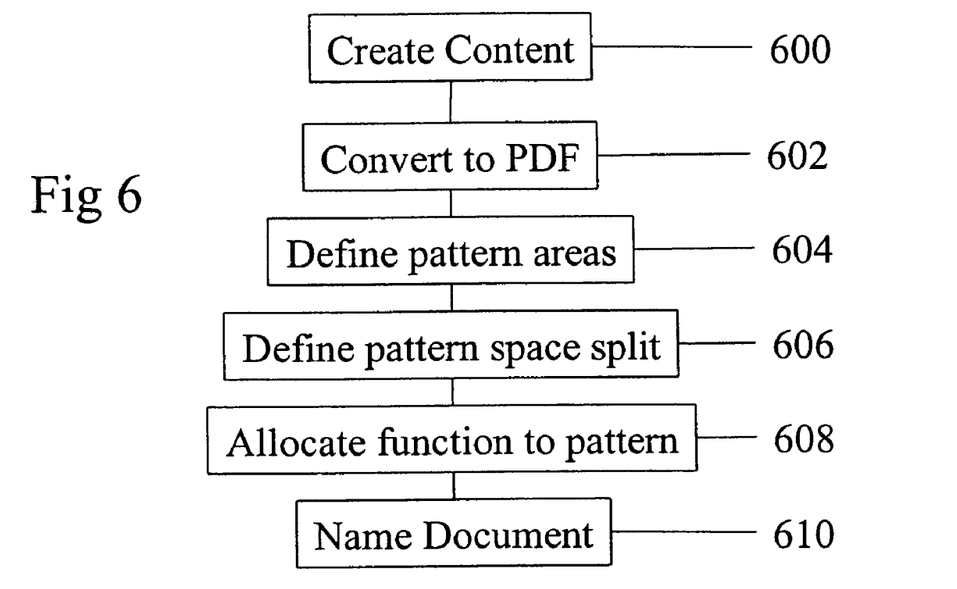
FIG. 6 is a flow diagram showing a method for designing a form using the system of FIG. 5.

In order to produce a set of digital documents 100, the first step is the design and creation of the document. Referring to FIG. 6 this starts at step 600 with the design of the content of the document, which is carried out on the PC using the application 402 or some other application. In this case the application is Acrobat Reader and the PC 302 also runs a number of other applications including a word processing package such as 'Word' a database package such as 'Access', and a spreadsheet package such as 'Excel'. Each of these can be used to design the content of the document. Then the areas of the document to which the pattern 108 are to be applied are defined by the user. In this case this is carried out using a form design tool (FDT) 416 in the form of an Acrobat 5.0 plug-in. The content is therefore converted to PDF format at step 602, and the pattern areas defined using the FDT 416 at step 604, producing a digital document defining both the content and the positions and shapes of the pattern areas.

Depending on the FDT 416, those areas 107 can be defined in terms of their absolute positions, sizes and shapes on the document, or in relation to the content, such as by an indication of which of the boxes 114, 116, 118, 120, 121, 122 are to have the pattern 108 printed in them. Association of a pattern area 107 with a content feature, such as a check box, can be used such that moving the content feature within the document design moves the associated pattern area 107 with it. This is helpful when designing and modifying the document. In either case, although there is a specific pattern area 107 associated with each of the printed boxes 118, 120, 121, 122, the pattern areas 107 do not have to correspond exactly to the areas of the printed boxes 118, 120, 121, 122. The pattern areas 107 will each generally be made larger than the box 118, 120, 121, 122 with which it is associated, so that when a user is writing or making some other mark within one of the boxes, if he is slightly inaccurate in positioning the mark on the page, the pen 300 will still be able to detect where it is on the page.

Figure 7:
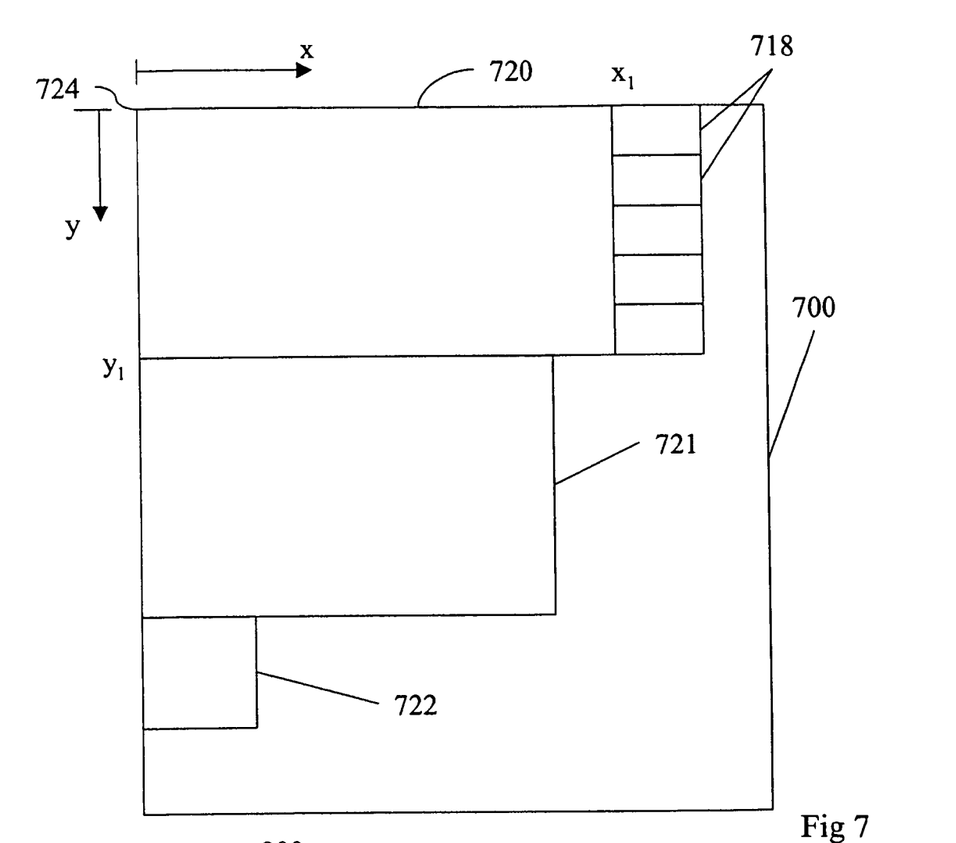
FIG. 7 shows the allocation of pattern space to the document of FIG. 1.

The pattern areas 107 also have allocated to them a relative position within the total pattern space area that will be requested from, and allocated by, the server 304. Referring to FIG. 7, the single page 700 of pattern space required for the form 100 can be broken down by the FDT 416 into a number of separate pattern space areas 718, 720, 721, 722 which are to be allocated to the respective boxes 118, 120, 121, 122 on the form 100. These pattern space areas 718, 720, 721, 722 can be arranged on the page 700 of pattern space in any suitable way, and in particular the relative positions of the pattern space areas 718, 720, 721, 722 on the pattern space page 700 can differ from their relative positions on the final form 100. Because the form 100 only has some specific areas covered by the pattern 107, and other areas to which no pattern is applied, this allows the amount of pattern space used to be kept to a minimum. In this example it allows a two page form 100 to be produced using only a single page 700 of pattern space.

Each area is identified by its coordinates on the page 700. In this case it is assumed that all allocated pattern space areas will be rectangular, and each is identified by the position of its top left and bottom right corners. The coordinate system used has its origin at the top left hand corner 724 of the page and includes an x coordinate indicating the distance to the right of the origin, and a y coordinate indicating the distance down from the origin. The pattern space area 720, for example, is identified by the coordinates $(0,0; x_1\ y_1)$.

The allocation of the pattern space areas 718, 720, 721, 722 is carried out by the FDT 416 once the form layout has been determined by the user. This allows the division of the allocated pattern space 700 to be performed in the most efficient manner with the minimum amount of wasted pattern space. In an alternative set-up it is possible for the user to specify the division of the allocated pattern space 700.

Then the functions associated with the various patterned areas 718, 720, 721, 722 are defined at step 608 so that the application 402 can process data received back when the document 100 has been written on. In the case of the questionnaire document 100 the pattern areas in the larger boxes 120, 121 are identified as a graphical input areas, for which any pen markings should be stored graphically, or perhaps analysed using character recognition and stored as text. The pattern associated with the check boxes 118 is associated with the respective response options so that the checking of the boxes 118 on a number of the forms 100 produces a standard mark, such as a cross, in the check box of the stored document. The pattern associated with the send box 122 is associated with the send function which will cause the pen to stop recording pen strokes for the document 100 and send them to the ASH 306.

Finally the designed document is saved and allocated a document name at step 610.

Figure 8:
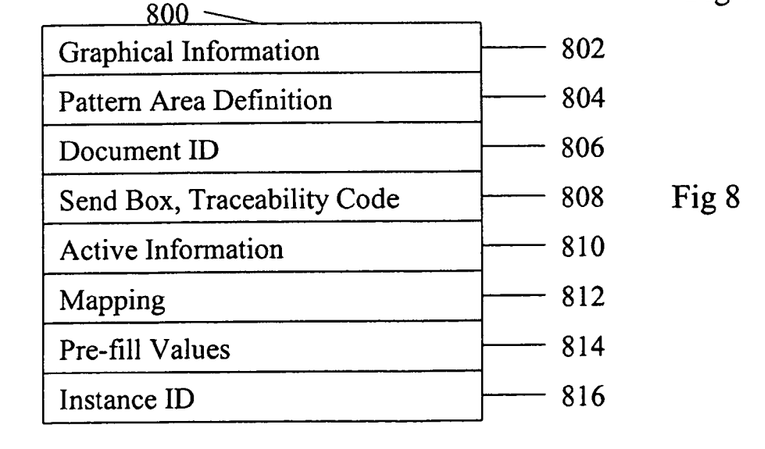
FIG. 8 shows an electronic file defining the document of FIG. 1.

When the form 100 has been completely designed, all of the information relating to the form is stored as a PDF file 800 as shown in FIG. 8. This PDF file contains graphical information 802 defining the content of the form 100, and a pattern area definition 804 defining the sizes and positions of the pattern areas on the document 100, and their associated functions, and also their relative positions in the pattern space page 700 which will be allocated to the document 100. It also contains a document ID 806, an identification 808 of the pattern associated with the send box 122, a traceability code 808, and other active information 810. The PDF file also contains mapping information 812 for mapping data from databases or other sources onto the document 100. In this case this would be the location of the user's name 114 and ID 116 on the database 414, as well as values 814 for pre-filled fields, in this case being the user's name 114 and ID 116 as extracted from the database 414. It also contains a document instance ID 816 which is unique to the individual document to be printed. This may not be inserted until the time of printing. Normally there will only be one printed document with a particular instance ID 816 so that documents can be tracked and identified. However, in some cases it may be desirable to be able to print more than one copy of exactly the same document with the same instance ID.

Once the document 100 has been designed, the user indicates, using the PDT 416 that it is completed, and the FDT 416 saves the document as a PDF file and allocates a document name to the document 100 as indicated above. The FDT 416 also creates a Paper Application Definition (PAD) file which is a file defining those features or parameters of the document 100 that will be needed by the ASH 306 to interpret pen strokes made on the document 100. Those parameters include the size and shape of the pattern areas, their relative positions in pattern space, in this case their positions on the page 700 of pattern space, and their functions, such as whether they are check boxes, areas for graphical input, areas for ICR analysis or areas having other functions. These parameters are the ones necessary to allow the processing of pen strokes made on the document 100 using the pen 300. The exact positions of the pattern areas on the document 100 are not included in these parameters, as the layout of the document 100 can be varied as will be described below. The PAD file is transmitted to the ASH 306 when the document 100 has been designed, so that the ASH can interpret pen strokes on the document 100 and produce the necessary inputs to the application 402.

The pattern space area 722 allocated to the send box 122 also needs to be identified to the pen 300 so that it can detect when it is written on and respond by sending the pen stroke data. This information can be transmitted to the pen 300 using the Bluetooth link when the document 100 has been designed. However it is more convenient for the template 410 for the document 100 to define an area, within the required page 700 of pattern space, which will always be associated with the send box 122. A number of pages of pattern space are then generally allocated to documents using that template. The pen can therefore have a record of all the possible pattern space areas 722 that can be allocated to send boxes 122 of forms 100 from the template 410. It will then recognized any of those areas when it writes in one of the send boxes 122, and respond by sending the pen stroke information to the LPLS 309. A still further possibility is to use the same area of pattern space for the send box 122 on all forms 100 produced from the template 410. In this case the send box will not have an individual document ID associated with it, but once the ASH 306 receives the pen stroke data it can determine from that data which page of pattern space has been used, and therefore the individual document ID.

Figure 9:
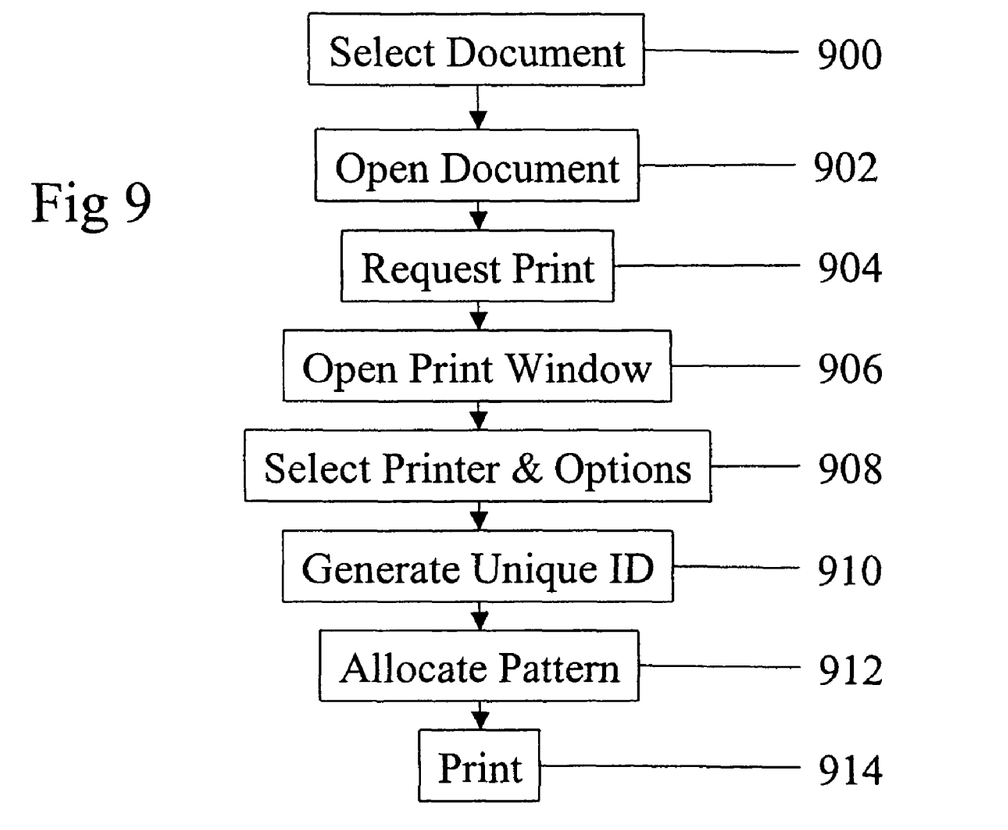
FIG. 9 is a flow diagram showing the process according to an embodiment of the invention for printing the document of FIG. 1 on the system of FIG. 5.

Referring to FIG. 9, once the document has been designed, the user can print it out locally using the printer 308. Typically a number of versions of the document 100 will be required, for example a number of questionnaires each with different instance IDs for use by different respondents. However the simplest case is the printing of a single document which will now be described. In this case it is assumed that the user wants to print off one copy of the document 100 for a single respondent, with the name and ID number of the respondent being taken from the database 414.

First the user therefore selects the document design by its document name, at step 900 using the user interface 412, and opens the document at step 902 so that he can view it using the application 402. He can then insert manually any pre-filled data to be included in the document. Then at step 904 to start the printing process he selects a printing option, which causes the PoD tool 400 to open a printing user interface (UI) at step 906. Using the printing UI he requests the number of prints and various other printing parameters. The PoD tool 400 identifies from the document file name that the document is one having the position identifying pattern on it and identifies the printers on the network which are capable of printing the pattern to a satisfactory quality. These might include high resolution (1200 dpi) inkjet and laser jet printers. Other printers on the network which are not suitable for printing the pattern are not identified to the user. The list of suitable printers is displayed to the user, who can then select one of them for the print job at step 908. The user then also indicates the number of prints he wants to print, in this case one. Then the user initiates the actual printing, inputting a print command via the printing UI.

When the actual print is initiated, the PoD tool 400 allocates a unique instance ID to the printed document 100 at step 910. It then requests the required amount of pattern space from the server 304, in this case one page, providing the document name and instance ID to the server 304, and receives back a definition of the required pattern space. This can be, for example, as a co-ordinate reference within the total pattern space, or as a full definition of the actual pattern to be used, such as a bit map. It then divides up the pattern space in the required manner to fit the pattern areas on the document, at step 912, as shown in FIG. 7, and adds this information to the PDF file 600. The PDF file 600 then contains all the information required to print the document 100 for the first respondent. It therefore converts the PDF file into a language that can be understood by the base printer driver 406, such as PCL5 or Postscript, and sends it to the base printer driver 406, from where it is sent to the print engine 404 which controls the printing of the hard copy document 100.

If the user wants to print a number of documents 100 for different recipients he first opens the document 100 using the application 402, and then uses the FDT 416 to modify the document to produce a number of individual PDF files corresponding to the individual documents, each one including a mapping to a respective respondent name and ID number from the database 414. These are then sent to print as a batch, and for each one the allocation of a unique instance ID and the printing process proceeds as described above with reference to FIG. 9.

For any application it is likely that a number of completely different document designs will be needed, and these will be designed separately and have different document names. These could range from a simple blank page with a single un-broken page of position identifying pattern printed on it, to simple single page documents with a single small area of position identifying pattern, to complex multiple page documents with a large number of separately defined pattern areas. For each document type the ASH 306 needs to have been provided with a definition of all of the pattern areas including their sizes, relative positions in the pattern space, and the type of processing required for the pen strokes made on them. However, for any particular document design, such as the questionnaire form 100, the user may wish to modify the design of the document before printing it. Using the system described above, the document 100 can be modified in various ways, and the way in which it is modified will determine how the modifications need to be recorded in the system.

The simplest modifications are those that do not alter the overall layout of the document. For example the colour of the content and the font of any written content can be modified before the document is printed without affecting the operation of the system at all. These features can conveniently be changed using the printing UI at the time of printing. Other modifications to the content can also be made easily, such as amending the written content to make it more suitable for a particular use.

Moving the pattern areas 107 around on the document also does not affect the processing of the document, as the processing relies on the recognition of a pattern area by the pen 300 and the processing of pen markings made on that pattern area by the ASH 306. As each of the pattern areas 107 on the document 100 is separately defined in the total pattern space and identified with a function, the actual position of the pattern areas on the physical document 100 does not affect the operation of the system. Therefore, for a document that has been designed and given a document name, such as the document 100, the mobility of the pattern areas 107 allows modifications to the positions of the pattern areas 107 to be made before the document is printed without affecting processing of the document. For example, the check boxes 118 and their associated pattern 108 can be moved, or have their positions swapped with the comments box 120. This mobility in the pattern areas 107 obviously gives significant freedom in the design and modification of the document 100. Where the content of the document varies significantly between the different instances, for example where the content includes written information which can vary significantly in length, the document can be made self formatting to a certain extent so that the position of the content and associated pattern areas 107 is adjusted automatically to provide suitable formatting for the document 100.

Figure 10:
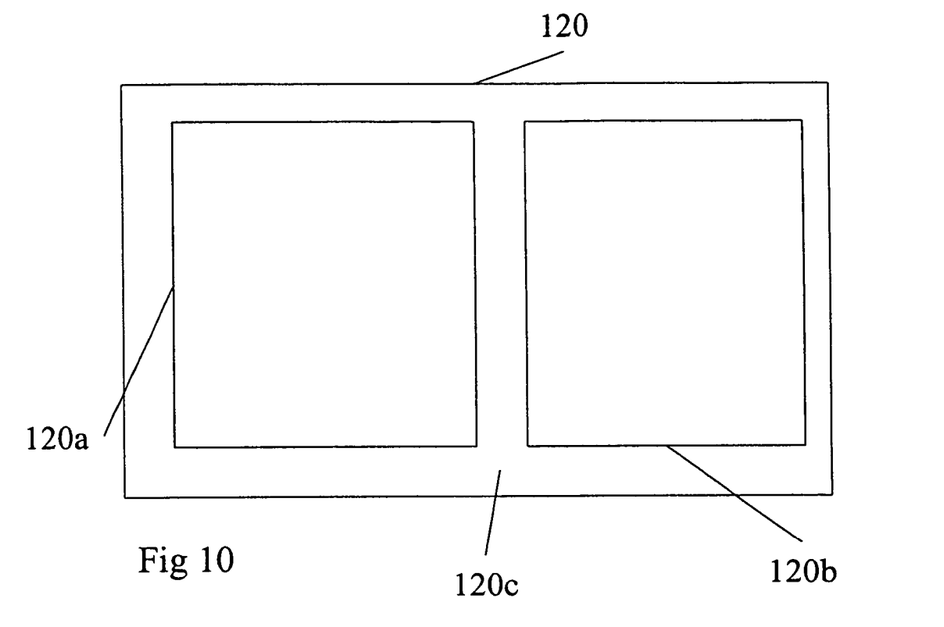
FIG. 10 shows a modification to part of the form of FIG. 1.
Figure 11:
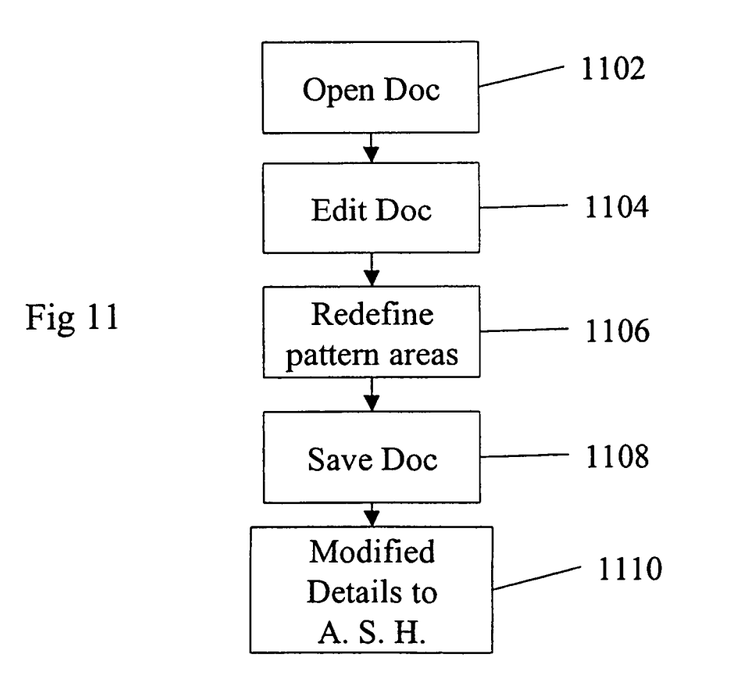
FIG. 11 is a flow diagram showing a method according to an embodiment of the invention for modifying the document of FIG. 1 before printing.

Some modification to the size and function of each of the pattern areas 107 can also be made for a particular instance of the document 100. However these modifications will need to be communicated to the ASH 306 so that it can properly interpret the pen strokes made on the document 100. For example, as shown in FIG. 10, the comments box 120 could be divided into two separate areas 120*a*, 120*b*, which would be spaced apart on the printed document 100 and have different headings printed next to them to indicated to the recipient that they are for different purposes. For example, they could be headed 'positive comments' and 'negative comments'. Also the total area of the two boxes could be made smaller than that of the original box 120, so that some of the pattern area 120 allocated to the comments box would in effect not be used or needed. The unused pattern area 120*c* can either not be printed at all, or it can be printed, and pen strokes made on it ignored by the ASH. The comments written in the two areas would then need to be distinguished by the ASH 306 when the pen strokes are analysed, and stored in different fields in the electronically stored document. In order to make such an amendment a process as shown in FIG. 11 is used. The document is opened at step 1102, then it is amended at step 1104 using the FDT 416. The pattern areas and their functions are re-defined at step 1106. The amended form is then saved again at step 1108 and given a different document name, and the details of the new design are saved in a new PAD file which is forwarded to the ASH 306 at step 1110. With this type of modification of the document 100 it is not necessary to notify the pattern allocation module 408, since it can still allocate the same amount of required pattern space, in this case the single page 700, to the document. In a similar manner, the two separate comment pattern areas 120, 121 could be merged into a single pattern area, so that comments written on any part of the merged area would be saved together. In this case the pattern allocation would most conveniently be made to allocate the merged pattern area as a single block. However, as an alternative the new PAD file could define two separately allocated areas to be treated by the ASH 306 as a single area.

In the embodiment described above, the pattern allocation module 408 only keeps a record of the particular printed document to which a particular pattern area page has been allocated. The more detailed allocation of specific areas within the page is not made by, or even communicated to the allocation unit. Such an arrangement may be useful where a supplier of pattern sells pages of pattern space to the user. However, in some cases the user company may have purchased, or generated for itself, a large area of pattern space to use and re-use according to its needs. In this case the pattern allocation module 408 can manage the pattern allocation at a more detailed level and in a more flexible manner. It can also perform the functions of the LPLS 309 described above, receiving the pen stroke data from the pen 300 and identifying back to the pen 300 the identity of a document and the appropriate ASH 306 from the send box pattern. In this case the pattern allocation module 408 keeps a record of each separate allocated pattern space area, including its size and shape and position in the pattern space, the unique identity of the document to which it has been allocated, the function of the pattern space area to which it has been allocated, the application with which the document is associated and the appropriate ASH 306. Much of this data is defined in the PAD files, and in this type of system the server on which the pattern allocation module 408 is held can also have the PAD files of all of the designed documents stored on it. In this case the pen stroke data from the pen is sent to this server which performs the function of the LPLS 309, as described above, and can identify the document and its associated application from that penstroke data. The server then sends the pen stroke data with the relevant PAD file to the relevant ASH to enable it to process the pen stroke data. Also in this case the FDT 416 does not specify the relative positions in pattern space of the various pattern space areas to be allocated to the pattern areas 107 on the document 100. Each area of pattern space is allocated separately by the allocation module 408, as is described in more detail below.

Figure 12:
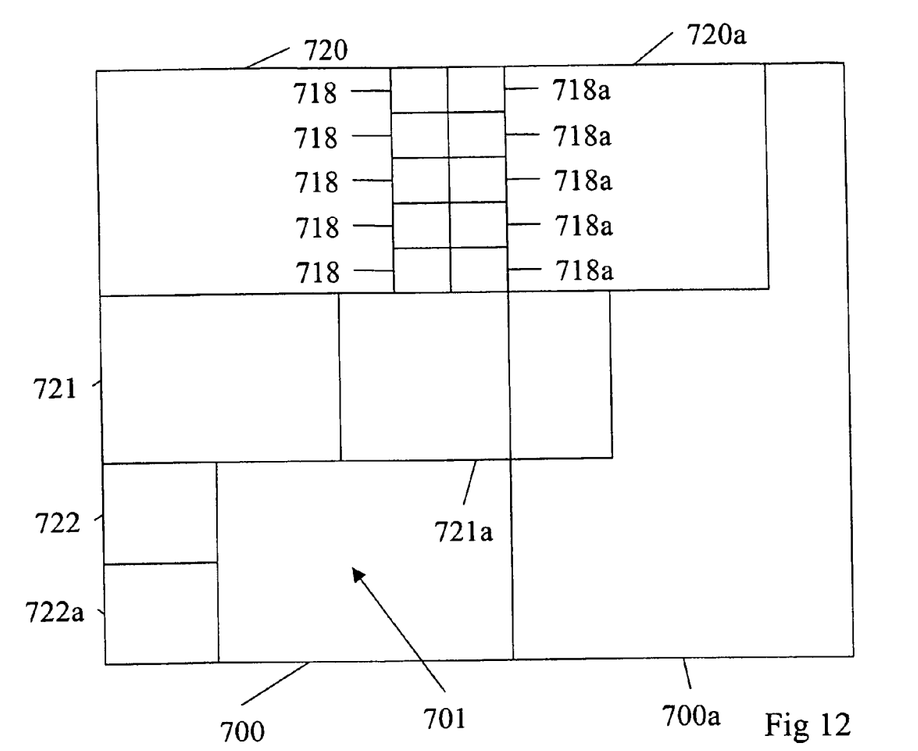
FIG. 12 shows a method according to a further embodiment of the invention for allocating pattern space to documents similar to those of FIG. 1.

Referring to FIG. 12, the pattern space page 700 from FIG. 7 has the pattern areas 718, 720, 721, 722 defined upon it as described above with reference to FIG. 7. Those areas have been arranged so as to minimize the amount of unused pattern space on the page 700. However they still form an irregular shape on the page 700 and, if one page is used per printed document, then there will be areas of the pattern space which are never used. In order to reduce the amount of unused space, the pattern allocation module 408 can be arranged to allocate any available pattern space to any document instance using an algorithm that is arranged to reduce the total unused pattern space. In this case, when a document is to be printed, the PoD tool 404 requests from the server 304 not just a single pattern space page, but the exact pattern areas it needs, defining their size, shape and relative orientation, as well as the document instance ID. The server 304 then takes these areas from the available pattern space in the most efficient manner. In this example, the only restriction on the use of pattern space is that an area 701 at the bottom of the page 700 is reserved for allocation to send boxes. This area 701 is therefore identified to any pens to be used with the system, so that they can identify when a send box has been marked. The pattern area 722 for the form 722 can therefore be considered to have been taken from the area 701 because of the specific designation of that area.

If a further questionnaire similar to the first one 100 is to be printed, this will require pattern areas 718a, 720a, 721a and 722a corresponding to the pattern areas 718, 720, 721, and 722. In this case some of these can be taken from the same pattern space page 700, as shown in FIG. 12, and some of them from an adjacent page of pattern space 700a. It should be noted that the relative position on the page 700 of the pattern areas 718a, 720a, 721a and 722a for the second document instance can be different from those of the first document instance, each separate pattern area being taken from the most appropriate place. Also, all of the pattern areas for any one document instance to not need to be adjacent to each other, and can in theory be taken from any point in the available pattern space. The pattern space 722a allocated to the send box of the second document must, however, be taken from the designated area 701.

It will be appreciated that the relevance of the pattern space being divided into pages is less relevant in this arrangement. Although it may still be so divided for ease of identification of any area in the pattern space, the server 304 can treat all of the pattern space at its disposal as a single continuous area. Each pattern area to be allocated can be taken from any point on any page. As shown for the area 721a, a single pattern area can extend over the nominal division between two pages 700, 700a.

When each of the forms 100 have been completely defined and are ready for printing, a PDF file and a PAD file are created for each of them. In this case the PAD file identifies completely the specific area of pattern space allocated to each pattern area on the document. It does this by identifying the page 700, 700a and the coordinates on the page of each pattern space area. The PAD file is then sent to the server 304 for storing and forwarding to the ASH 306.

Figure 13:
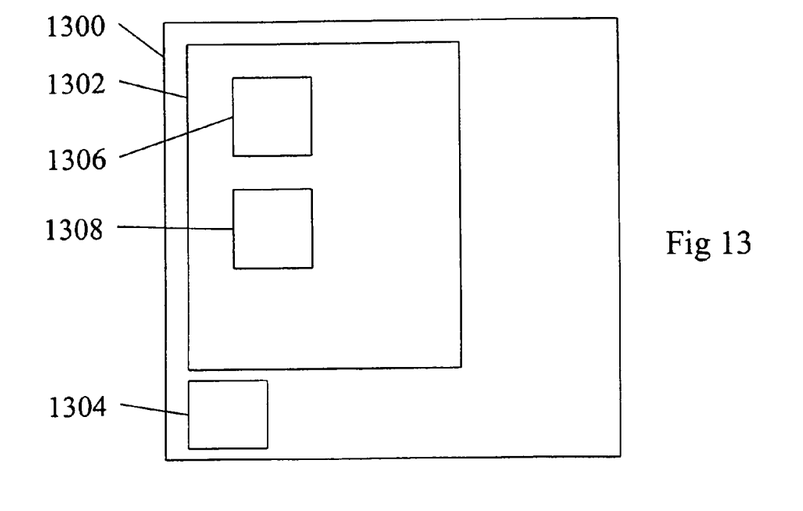
FIG. 13 shows a document design for use in the system of FIG. 5.

Referring to FIG. 13, a further example of a document design 1300 is arranged for general use. This document design, stored as a PDF file, specifies very few details of the pattern areas on the document and no details of the document content. Specifically the document design defines a large pattern area 1302, the use of which is not specified, and a small pattern area 1304 which is designated as the send box. Because nearly the whole of the document design 1300 is to have pattern applied to it, the required pattern space to be allocated to the document is a single page of pattern space. When this document design 1300 is used in the system of FIG. 5, the user has a large degree of freedom as to how the pattern area 1304 is to be split up, and what content he wants to add to the document. Using the PoD tool 400 the user can define a number of areas 1306, 1308 within the pattern area 1304 and assign functions to them, and could, for example, produce a final design similar to that of FIG. 1. However, in this case, at the pattern space allocation step, the allocation of areas of pattern space is not carried out separately for each of the various pattern areas 1304, 1306, 1308 in the document, but rather a single page of pattern space is allocated to the document instance to be printed. The exact pattern space area that will be allocated to each of the pattern areas 1304, 1306, 1308 therefore depends on its position on the document 1300, and that information needs to be included in the PAD file sent to the server 304, for subsequent forwarding to the ASH 306, when the document is printed. In this case as the send box area 1304 is specified, it does not need to be identified to the pen 300 for each printed document instance, provided the pen 300 has a record of a group of pattern space pages to be allocated to document instances produced from the design 1300.

Figure 14:
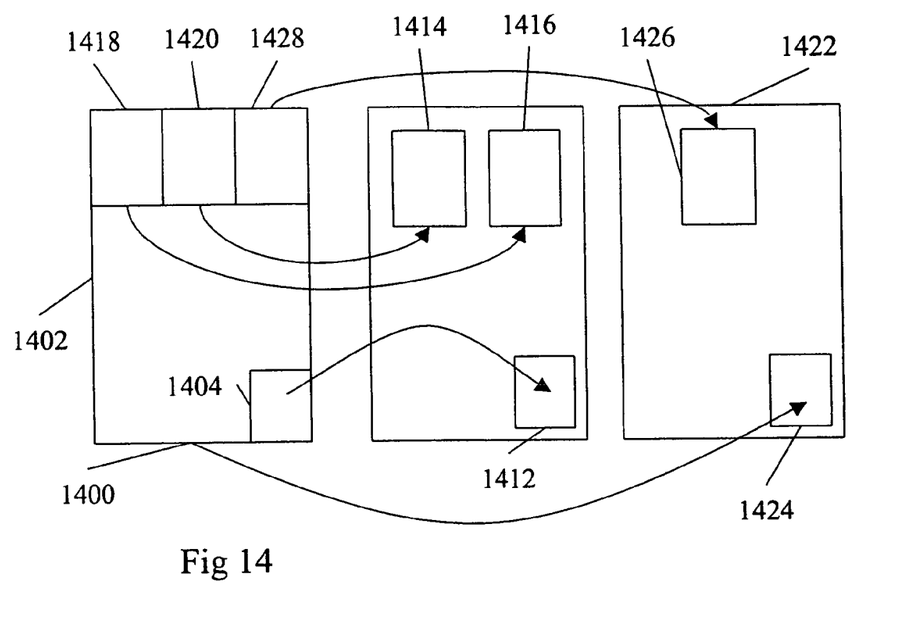
FIG. 14 shows the allocation of a page of pattern space to two documents by the system of FIG. 5.

Referring to FIG. 14, in a further modification to the system described above each page 1400 of pattern space, defined in the allocation module 408, comprises a large general area 1402 of pattern space which can be used for a variety of purposes, and a document completion area 1404 which is reserved for use in the send box of one or more documents. The allocation module is arranged, when it receives a request for pattern space by the PoD tool 400 for a document 1410, to find the next page 1400 which is available, allocate the document completion area 1404 to the send box 1412 on the document, and break up the general area 1402 so that it can allocate parts of it to the other pattern areas on the document 1410. In this case the document 1410 includes two further pattern areas 1414, 1416, which the PoD tool 400 identifies to the allocation module 408 by indicating their size, their function, the unique identity of the document 1410 and the application to which the document 1410 relates and the appropriate ASH 306. The allocation module 408 identifies the pattern space page 1400 as having some available pattern space in it and allocates the document completion area 1404 from it to the send box 1412. It also allocates further areas 1418, 1420 of pattern space to the pattern areas 1414, 1416.

Then when the PoD tool 400 requests further pattern space for a further document 1422 having a send box 1424 and another pattern area 1426, the allocation module 408 first checks whether the document is associated with the same application, or at least can be processed by the same ASH as the first document 1400. If it is not, then a different pattern space page is used.

However, if it is, the allocation module 408 identifies the page 1400 as still having suitable available space on it. It therefore allocates the same document completion area 1404 to the send box 1424 of this document also, and allocates an available area 1428 from the pattern space page 1400 to the pattern area 1426. All of these allocations are recorded in the server 304, for communication to the ASH 306 when pen stroke interpretation is required.

When the pen 300 is used to mark the send box 1412, 1424 of one of the documents 1410 1422, it sends the pen stroke data to the server 304 which identifies the send box as being related to one of the two documents 1410, 1422. It then checks the pattern space area which has been allocated to the part of the document on which the pen strokes have been made, and from that determines which of the two documents 1410, 1422 have been marked.

This enables it to forward the correct document ID with the pen stroke data process the pen stroke data correctly.

The invention claimed is:

1. A system for printing a document instance having a position identifying pattern on it, the system comprising:
 a memory arranged to have a document definition stored therein which defines a document having at least one pattern area to which the position identifying pattern is to be allocated, and
 printing control means arranged to:
  automatically adjust defined document content position and automatically move the boundaries of the at least one defined pattern area to produce a modified document definition,
  allocate an area of a pattern space to the at least one defined pattern area,
  associate one of the at least one defined pattern area with a content feature such that moving the content feature also moves the associated pattern area, the associated pattern area being larger than the content feature, and
  cause printing of the document instance,
 wherein the document has some areas to which the position identifying pattern is not applied.

2. A system according to claim 1 further comprising a user interface arranged to enable a user to control the printing control means to move the boundaries of the defined pattern area for the document instance before causing printing of the document instance from the design definition.

3. A system according to claim 1 wherein the printing control means is arranged to change the defined position of a pattern area before causing printing of the document instance.

4. A system according to claim 1 wherein the printing control means is arranged to change the defined size of a pattern area before causing printing of the document instance.

5. A system according to claim 1 wherein the printing control means is arranged to:
 split-up a defined pattern area into two or more separate defined pattern areas before causing printing of the document instance, and
 move one of the two or more separate defined pattern areas to a different location on the document.

6. A system according to claim 1 wherein the printing control means is arranged to merge two defined pattern areas into a single defined pattern area before causing printing of the document instance.

7. A system according to claim 1 wherein the printing control means is arranged to record the modified document definition, including details of the modified pattern areas, for use in interpreting pen strokes made on the document after printing.

8. A system according to claim 1 having a document design definition stored in said memory.

9. A system according to claim 1 further comprising a pen stroke interpretation system arranged to receive pen stroke data from a digital pen and interpret the pen stroke data to provide an input to an application.

10. A system according to claim 1 including a pattern space allocation means arranged to allocate an area of pattern space to be associated with the document instance, and to record which area of pattern space has been so allocated thereby to enable the association of pen stroke data, derived from pen strokes on the printed document instance, to the document instance.

11. A method of printing a document instance having a position identifying pattern on it, the method comprising the steps of:
 providing to a memory a document definition which defines a document having at least one pattern area to which the position identifying pattern is to be allocated,
 automatically adjusting defined document content position,
 automatically, with a printing control means, moving the boundaries of the at least one defined pattern area responsive to the adjusted content position to produce a modified document definition,
 allocating an area of pattern space to the at least one pattern area,
 associating one of the at least one defined pattern area with a content feature such that moving the content feature also moves the associated pattern area, the associated pattern area being larger than the content feature, and
 printing the document instance,
 wherein the document has some areas to which the position identifying pattern is not applied.

12. A method according to claim 11 wherein step of moving the boundaries of the defined pattern area is carried out under the control of a user.

13. A method according to claim 11 wherein the step of moving the boundaries of the defined pattern area comprises changing the defined position of the pattern area.

14. A method according to claim 11 wherein the step of moving the boundaries of the defined pattern area comprises changing the defined size of the pattern area.

15. A method according to claim 11 wherein the step of moving the boundaries of the defined pattern area comprises splitting-up the pattern area into two or more pattern areas and moving one of the two or more separate defined pattern areas to a different location on the document.

16. A method according to claim 11 wherein the step of moving the boundaries of the defined pattern area comprises merging the pattern area with another pattern area to form a single pattern area.

17. A method according to claim 11 further comprising modifying a function associated with the pattern area before printing the document instance.

18. A method according to claim 11 further comprising recording the modified document definition, including details of the modified pattern areas, for use in interpreting pen strokes made on the document after printing.

19. A method according to claim 11 wherein the allocating step comprises allocating separate areas of pattern space to respective pattern areas in one document instance.

20. A data carrier carrying data arranged to control a computer system to carry out the method according to claim 11.

* * * * *